United States Patent Office 2,768,158
Patented Oct. 23, 1956

2,768,158

TRIAZINE DYES

Albert Frederick Strobel, Phillipsburg, N. J., and William Wilson Williams, Easton, Pa., assignors to General Aniline & Film Corporation, New York, N. Y., a corporation of Delaware No Drawing. Application March 30, 1953,
Serial No. 345,732

6 Claims. (Cl. 260—153)

This invention relates to triazine dyes for cotton containing the carbamyl hydrazide group or its imido or thio analogue.

It is common practice in synthesizing dyes from cyanuric chloride to carry out the third or final condensation (elimination of the active halogen atoms) with aniline. Thus, for example, cyanuric chloride is made to react first with one mole of an amino containing azo compound like the dye:

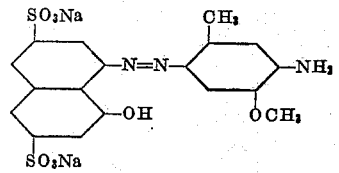

This mono condensation product is then condensed with 1 mole of a second amino azo dye like 4-amino azobenzene. This secondary condensation product of cyanuric chloride with the 2-amino mono azo dyes is condensed finally with aniline. The product so obtained is coupled alkaline with diazotized H acid. As another example, 4,4'-diamino stilbene-2,2'-disulfonic acid is condensed first with 2 moles of cyanuric chloride to give the di-condensation product:

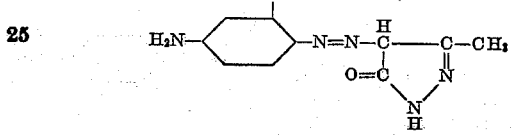

This product is then condensed with 2 moles of the amino monoazo dye:

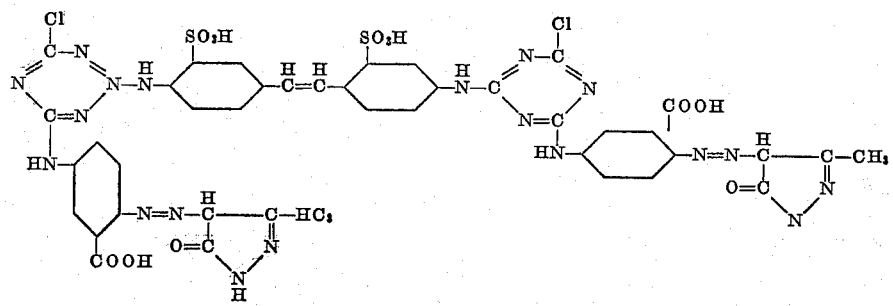

to give

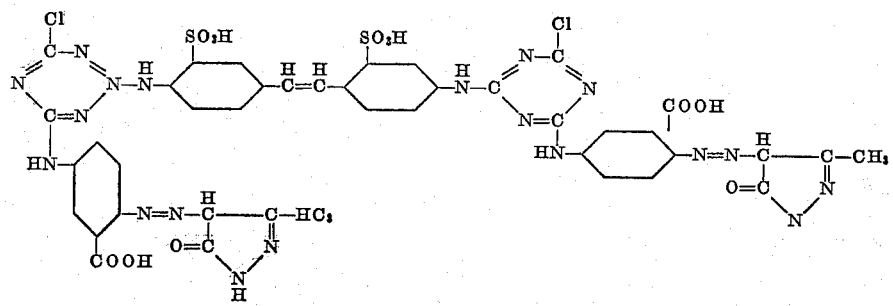

This product is then condensed with 2 moles of aniline to give the final dye:

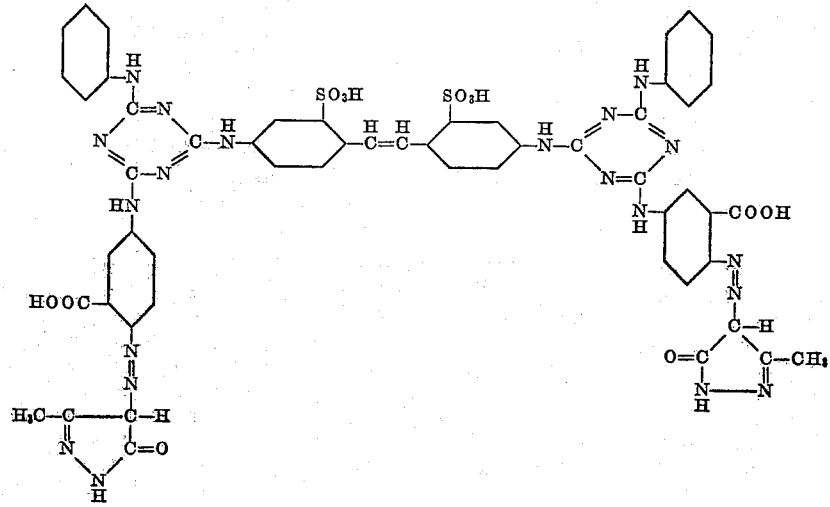

The above dyes are but two examples of a host of dyes which have been derived from cyanuric chloride in which the third or final condensation of the active halogen is made to aniline. Other amines have been reported in the final condensation, for instance, N-methyl aniline (U. S. Patent 2,301,333, page 4, Example 5) and methyl amine (U. S. Patent 2,399,066, page 2, Example 5).

Most of the dyes of the cyanuric chloride type are applied to cotton or regenerated cellulose. It is standard practice to after-treat direct cotton dyes with a product which is essentially a mixture of a copper salt (copper sulfate) and partially polymerized cyano guanidine-formaldehyde. The dyed cloth after-treated is somewhat more wash-fast than the untreated dyed cloth.

We have discovered that dyes derived from cyanuric chloride in which the third active halogen atom of the cyanuric chloride is condensed with guanyl hydrazine, semicarbazide or thiosemicarbazide, show even superior wet-fastness (washing) following after-treatment with the copper salt mixture, to dyes in which the third active halogen atom of the cyanuric chloride is condensed with aniline or other such amines. Thus, for example, if the two dyestuffs:

(A)

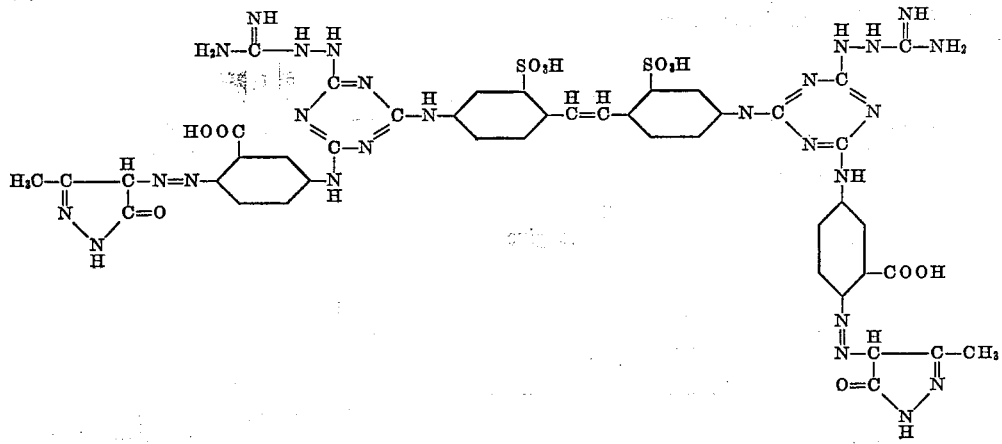

and (B)

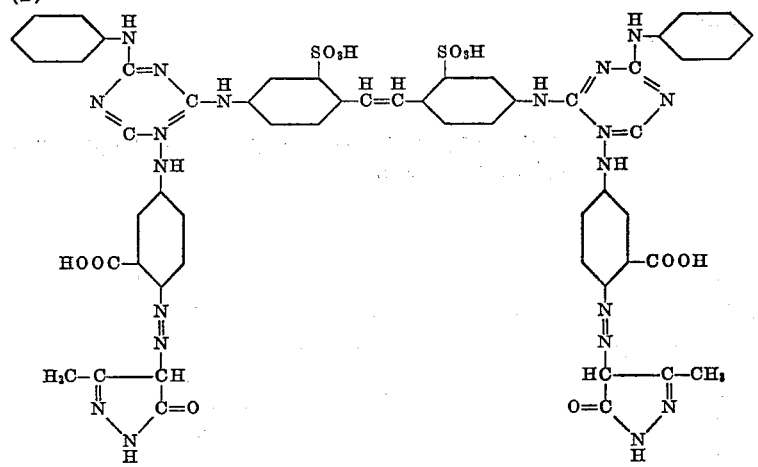

are separately dyed on cotton cloth by the usual direct dyeing application and the dyed cloth treated with the copper salt polymer mixture, the cloth dyed with dye (A) shows markedly superior fastness to washing in an AATCC wash test No. 3 than does the cloth dyed with dye (B).

The reason for the foregoing unusual and unexpected behavior is not clearly understood. It is believed, however, that the following explanation, based upon experimental observations may shed some light on the unusual and unexpected phenomenon: When cloth dyed with (A) above is subjected to an AATCC wash test without after-treating with the copper salt mixture, it is not as fast to washing as cloth similarly treated with dye (B) above.

Also, when cloth dyed with dye (A) above is after-treated with copper sulfate only, and then subjected to an AATCC No. 3 wash test, the dyed cloth is inferior in fastness to the cloth similarly treated with the dye (B) above. Thus, it would appear that some specific interaction or chemical reaction occurred between the

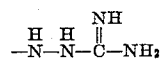

group of dye (A) and the

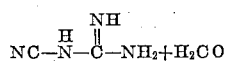

polymer of the copper salt mixture. In this connection, it is also significant that when amines other than aniline were used as third condensing agent with cyanuric chloride, the wash-fastness was no better than that of the dye prepared from aniline after treating the dyed cloth with the copper salt polymer mixture. Thus, it has been found that when morpholine, monomethylamine, monohydroxyethylamine, N-methylaniline, dihydroxyethylamine, α-naphthylamine, phenyl hydrazine, N-methyl anthranilic acid, and the like, are used in place of aniline as third condensing component with cyanuric chloride, the dyeings are not superior in AATCC wash test No. 3 to the dye (B) above when the copper salt polymer mixture after-treatment is used.

Moreover, we further discovered that when dyestuffs derived from diamino disulfostilbene, as described in U. S. Patent 2,399,066 and triazine dyes containing pyrazolone rings as described in U. S. Patent 2,301,333, including those illustrated above, wherein the final condensation is made with one of the following compounds:

$$H_2N-\underset{H}{N}-\underset{\underset{NH}{\|}}{C}-NH_2$$

β-Guanylhydrazide $$H_2N-\underset{H}{N}-\underset{\underset{O}{\|}}{C}-NH_2$$

Semicarbazide $$H_2N-\underset{H}{N}-\underset{\underset{S}{\|}}{C}-NH_2$$

Thiosemicarbazide dyestuffs are obtained which are superior in wash fastness to the dye (B) illustrated above. It appears that the beneficial action of the mixture of copper sulfate and partially polymerized cyano guanidine-formaldehyde, and similar mixtures currently available to textile printers, in improving the wash fastness of dyes containing any one of the foregoing guanylhydrazide, semicarbazide, or thiosemicarbazide is specific. It is possible to account for the behavior of the cyano guanidine-formaldehyde improvement by postulating a condensation of the hydroxymethyl residue of the aforementioned copper salt polymer mixture, with the semicarbazido, thiosemicarbazido and iminosemicarbazido end of the dye molecule. This interpretation is offered merely as a possible explanation of the unusual and unexpected effect of the dyestuffs involved in the present invention.

Accordingly, it is the object of the present invention to provide triazine dyes containing in one or two triazine nuclei a group characterized by the following formula:

$$-NH-NH-\underset{\underset{}{\overset{R}{\|}}}{C}-NH_2$$

wherein R represents O, S, or NH.

The dyestuffs provided by the present invention are derived, as described above, from cyanuric chloride in which one halogen atom of the cyanuric chloride is condensed with either β-guanylhydrazide, semicarbazide, or thiosemicarbazide, and are characterized by the following formulae:

[Structure of mono-triazine with $R_1$ substituent]

and

[Structure of bis-triazine with $R_1$ and $R_2$ substituents]

wherein R has the same value as above, $R_1$ represents a sulfonated or carboxylated mono azo dye radical connected to the triazine ring by an $$-\underset{H}{N}-$$

group, such as for example:

1.

[Structure] 3-carboxy-4-[3'-methyl-5'-oxo-4'-pyrazolyl-azo]-phenyl

2.

[Structure] 4-[3'-carboxy-4'-hydroxy phenylazo]-phenyl

3.

[Structure] 3-carboxy-4-[2',4'-hydroxy-5'-carboxy-phenyl-azo]-phenyl

4.

[Structure] 3-sulfo-4-[1'-phenyl-3'-methyl-5'-oxo-4'-pyrazolyl-azo]-phenyl

5.

[Structure] 3-carboxy-4-[1'-phenyl-3'-methyl-5'-oxo-4'-pyrazolyl-azo]-phenyl

6.

[Structure] 3-carboxy-4-[3'-sulfocarbanilino-1'-acetonyl-azo]-phenyl

7.

[Structure] 2-chloro-4-[1'-hydroxy-3'-sulfo-2'-naphthyl-azo]-5-hydroxyphenyl and $R_2$ represents a sulfonated or carboxylated diamino aromatic linking component radical, such as, for example, symmetrical diaryl diamine containing two solubilizing groups of the type —SO$_3$Na and —COONa, or diaryl diamine containing alkali solubilizing groups wherein each aryl group contains an amino group. The following are illustrative of such linking component radicals:

1.

[Structure] Stilbene-2,2'-disulfonic acid-4,4'-diamino

2.

[Structure] Diphenyl-3,3'-disulfonic acid-4,4'-diamino

3.

[Structure] Diphenyl-3,3'-dicarboxylic acid-4,4'-diamino

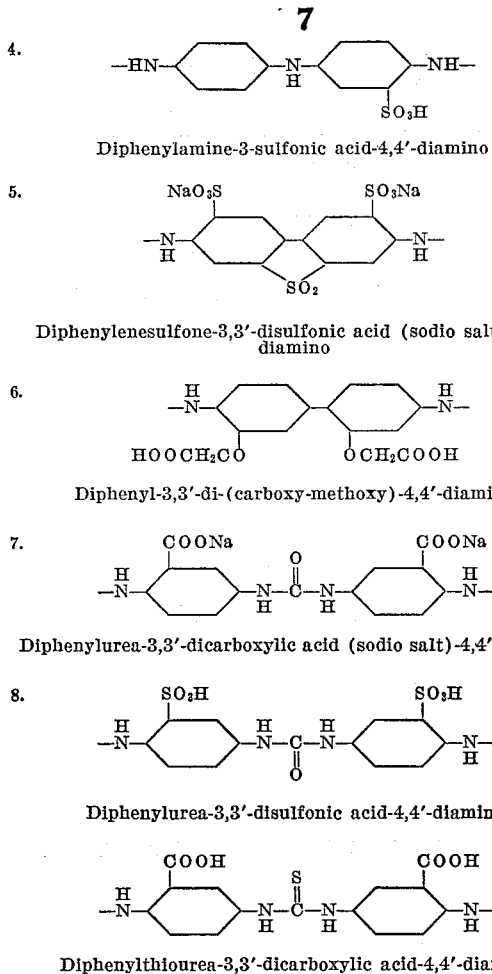

4. Diphenylamine-3-sulfonic acid-4,4'-diamino

5. Diphenylenesulfone-3,3'-disulfonic acid (sodio salt)-4,4'-diamino

6. Diphenyl-3,3'-di-(carboxy-methoxy)-4,4'-diamino

7. Diphenylurea-3,3'-dicarboxylic acid (sodio salt)-4,4'-diamino

8. Diphenylurea-3,3'-disulfonic acid-4,4'-diamino

Diphenylthiourea-3,3'-dicarboxylic acid-4,4'-diamino

The following examples illustrate the preparation of the dyestuffs and the application of them to cotton in connection with after-treating agents referred to above. All the parts are by weight unless otherwise specified.

*Example 1*

43.3 grams of 5-nitroanthranilic acid was slurried with 1500 ml. of water and then heated to 65° C. To the solution were added 56 ml. of 30% aqueous sodium nitrite. The resulting solution was maintained at 65° C. and it was dripped into a mixture of 72 ml. of conc. HCl and 150 ml. of water previously cooled to 10° C. The amine acid was added in 40 minutes maintaining a temperature of 15° C. by adding 200 grams of ice. After all had been added, the mixture was stirred for 1 hour at 13° C., then clarified by filtration from a small amount of precipitate. The excess of nitrite was removed by the addition of 5 ml. of 10% amine-sulfonic acid. Meanwhile a coupler solution was prepared by adding 23.4 grams of 3-methyl-5-pyrazolone to 200 ml. of water, heating to 70° C. and treated with 20.5 ml. of 40% aqueous caustic soda. The solution was cooled to 25° C.; pH=9.0. This pyrazolone solution was then diluted to 250 ml. by volume. It was added gradually to the diazo solution above. 77 ml. of 4 N-sodium acetate were added. Coupling was complete in 2 hours. The material was filtered and dried.

The dried product weighed 61.2 grams and amounted to an 87.6% yield. The reduction of the final product with sodium sulfide was accomplished by slurrying one-half of the dried product with 500 ml. of water and 10 ml. of 40% aqueous sodium hydroxide. To the slurry 36.5 grams of sodium sulfide were added and the slurry heated to 59° C. The temperature rose to 65° C. At this point, the heated mixture turned dark red in 5 minutes and black in 10 minutes. The mixture was stirred for 3 hours at 60–66° C., then cooled to room temperature and treated with 27 ml. of glacial acetic acid. A precipitate resulted which was filtered off. The filtrate was acidified with 50 ml. of concentrated hydrochloric acid and the heavy precipitate which formed was filtered off. The resulting presscake was reslurried in 350 ml. of water, treated with 10 ml. of 40% aqueous sodium hydroxide, heated to 80° C. and filtered to remove the sulfur precipitate. The filtrate was then cooled to 5° C. and the solid product removed by filtration and dried.

The monoazo dye intermediate prepared as above was utilized in the preparation of the dyestuff having the formula designated by (A) by the following procedure:

16 grams of 4,4'-diamino-2,2'-disulfostilbene were dissolved in 250 ml. of water and 25 ml. of 20% sodium carbonate on a steam bath, then cooled to 0° C. 14.2 grams of cyanuric chloride was dissolved in 60 ml. of acetone CP by heating to 35° C. (slight residue remained). This solution was poured into the diamine solution containing some excess ice at a temperature of 1°–4° C. The pH was 6.7 to 7.0. For 20 minutes the temperature was maintained at 2° C. with a pH of 6.8. 0.531 N caustic soda was added from a burette to neutralize the acid liberated in the reaction. 142 ml. of 0.531 N sodium hydroxide were added in 50 minutes, keeping the pH at 5.5 to 6.5. The test for free amine by coupling became negative. Total time for first condensation was 100 minutes.

22.5 grams of the monoazo dye prepared as above were dissolved on the steam bath in 750 ml. of water, cooled to 60° C., then poured on 600 grams of ice. No precipitate appeared. The first condensation product prepared above was poured into that solution of monoazo dye. No precipitate appeared. The temperature rose to 8° C. 78 ml. of 0.531 N caustic soda were added from a burette in 10 minutes bringing the pH to 7.0. The temperature was kept at 8°–15° C. for 1 hour. A gelatinous mass formed. 51.6 ml. more of 0.531 N sodium hydroxide were added bringing the pH to 10.3. The material was heated to 40° C. in 20 minutes. The pH dropped in this time from 10.3 to 9.5. Temperature was held at 45° C. and in 30 minutes the pH became 6.7. 8 ml. more of sodium hydroxide solution were added bringing the pH to 7.4. Five hours after beginning the second condensation, the test for free amine was negative and the pH was 6.9. The material was allowed to stand overnight. The pH was 6.7 in the morning. For the third condensation, 10.5 grams of guanyl hydrazine bicarbonate were slurried with 20 ml. of water and then treated with 70 ml. of 3.7% hydrochloric acid. This acid solution was then added to the second condensation product at 27° C. The pH became 6.0. 157 ml. of 0.531 N sodium hydroxide were added from a burette (equal to an amount necessary to neutralize 70 ml. of 3.7% hydrochloric acid to a pH of 7.0), and the pH rose from 6.8 to 10.9. The material was heated to 90° C. in 40 minutes and then kept at this temperature for 100 minutes. The pH dropped to 10.2. 136 ml. more of 0.531 N sodium hydroxide were added in 25 minutes. The pH rose to 11.3. The volume was about 3.5 liters and was kept at this value by water addition. The material was reheated to 70° C. and the pH was 9.8. 0.5 gram of β-guanylhydrazine bicarbonate was added, the temperature raised to 95° C., and maintained at 95° C. for 4½ hours. The pH dropped from 9.8 to 8.6. 80 ml. of 20% sodium carbonate were added and the material heated at 95° C. for ½ hour. The slurry was cooled to room temperature and filtered. The presscake was packed down and dried in a vacuum oven at 80° C. The dried product weighed 48.5 grams. The dye so prepared dyed cotton an orange-yellow shade, which on after-treatment with the copper salt polymer mixture was rendered fast to light and washing.

Example 2

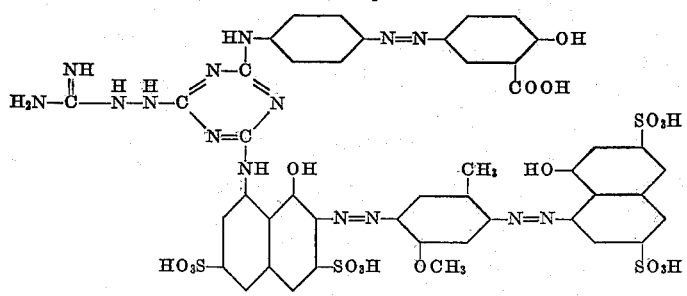

The above dyestuff was prepared by the procedure of the example of U. S. Patent 2,041,829 with the exception that 25 grams of β-guanylhydrazide were used in place of 30 grams of aniline.

Example 3

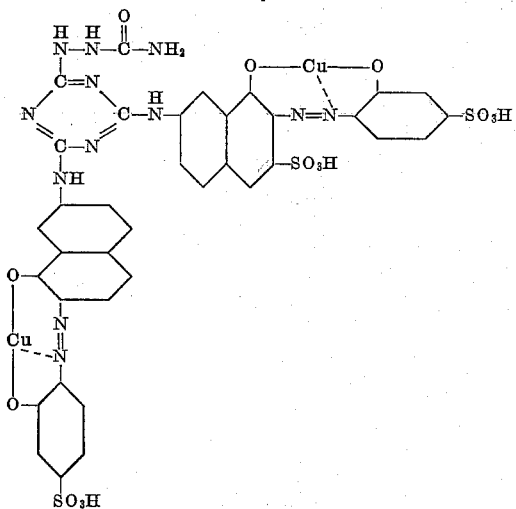

0.2 mole of the sodium salt of "J acid" having the following formula:

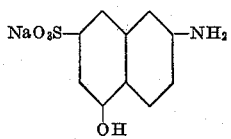

was added to a slurry of 18.3 grams of cyanuric chloride (0.1 mole) in 500 ml. of water. To this slurry at 10° C. there were added over a period of 1 hour 20 ml. of 40% sodium hydroxide, and the solution brought essentially to neutral at the end of 2 hours. The free amine test for J acid (self coupling) had disappeared at the end of this time. Then there are added 15 grams of semicarbazide, and the material is heated to 95° C. for 4 hours. At the end of this time there is added a slurry of 0.2 mole of the diazo of 2-amino phenol 4-sulfonic acid prepared in the usual manner. To the mixture of triazine compound and diazo there is added 200 ml. of 20% sodium carbonate solution (wt./vol.) and the mixture is stirred until the test for free diazo disappears (2 hours). The precipitate of dye is salted out, filtered, washed with 5% salt solution, and dried in a vacuum oven at 90° C. The dyestuff is reslurried in 500 ml. of water, and treated with acetic acid until the pH is 6.5. Then there were added 65 grams of copper sulfate and the dye slurry and copper sulfate stirred for 48 hours at room temperature. The mixture was evaporated at 80° C. to a thick paste, and finally dried in the vacuum oven at 125° C. for 1 day to give the final dyestuff, which dyes cotton a rubine shade.

Example 4

Example 2 was repeated with the exception that 25 grams of β-guanylhydrazide were replaced by 25 grams of thiosemicarbazide.

Example 5

Example 1 was repeated with the exception that 10.5 grams of β-guanylhydrazide were replaced by 25 grams of thiosemicarbazide.

Example 6

Example 1 was again repeated with the exception that 10.5 grams of β-guanylhydrazide were replaced by 10.5 grams of semicarbazide.

Example 7

Example 3 was repeated with the exception that 15 grams of semicarbazide were replaced by 15 grams of β-guanylthiosemicarbazide.

All of the dyes of the foregoing examples, including the dyestuff illustrated by designation (B), the dyestuff of the example of U. S. Patent 2,041,829 and a prepared dyestuff of Example 3 in which the semicarbazide is replaced by an anilino group, were employed in dyeing cotton skeins. The skein dyeing (10 grams of cotton skein) containing 0.1 gram of each one of the said dyes was after-treated with 0.2 gram of the copper salt polymer mixture in 300 ml. of water for 20 minutes at 160° F., removing the skein, rinsing and drying. The dyed samples in which the dyestuff is devoid of the aforementioned guanyl components became yellower and duller on after-treatment.

Each of the dyed and after-treated samples was subjected to the AATCC wash test No. 3. The samples in which the dyestuff is devoid of the aforementioned guanyl components were very poor in wash fastness, whereas those samples dyed with the dyestuffs containing the same components were exceptionally fast.

While there have been pointed out above certain preferred embodiments of the invention, the same is not limited to the foregoing examples, illustrations, or to the specific details given therein, but is capable of variations and modifications as to the reactants, proportions, and conditions employed.

We claim:
1. A triazine dye characterized by a formula selected from the class consisting of the following formulae:

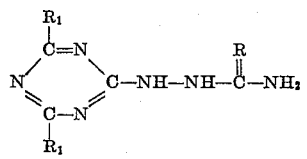

and

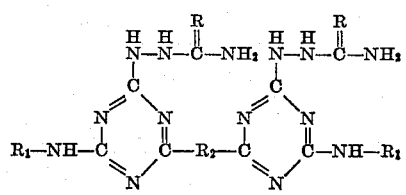

wherein R represents a member selected from the class consisting of O, S, and NH; $R_1$ represents a mono azo dye radical selected from the class consisting of 3-carboxy-4-[3'-methyl-5'-oxo-4'-pyrazolyl-azo]-phenyl, 4-[3'-carboxy - 4' - hydroxy-phenylazo] - phenyl, 3-carboxy-4-[2',4'-dihydroxy-5'-carboxy-phenylazo]-phenyl, 3-sulfo-4-[1'-phenyl-3'-methyl-5'-oxo-4'-pyrazolyl-azo] - phenyl, 3-carboxy - 4-[1'-phenyl-3'-methyl-5'-oxo-4'pyrazolyl-azo]-phenyl, 3-carboxy-4-[3' - sulfocarbanilino - 1' - acetonyl-azo]-phenyl, and 2-chloro-4-[1'hydroxy-3'-sulfo-2'-naphthyl-azo]-5'hydroxy phenyl radicals; and $R_2$ represents a diaryl diamino radical selected from the class consisting of stilbene-2,2'-disulfonic acid-4,4'-diamino, diphenyl-3,3'-disulfonic acid-4,4'-diamino, diphenyl-3,3'-dicarboxylic acid-4,4'-diamino, diphenylamine-3-sulfonic acid-4,4'-diamino, diphenylenesulfone-3,3'-disulfonic acid (sodium salt)-4,4'-diamino, diphenyl - 3,3' - di(carboxy-methoxy)-4,4'-diamino, diphenylurea-3,3'-dicarboxylic acid (sodium salt)-4,4'-diamino, diphenylurea-3,3'-disulfonic acid-4,4'-diamino and diphenylthiourea - 3,3' - dicarboxylic acid- 4,4'-diamino radicals.

2. A triazine dye characterized by the following formula:

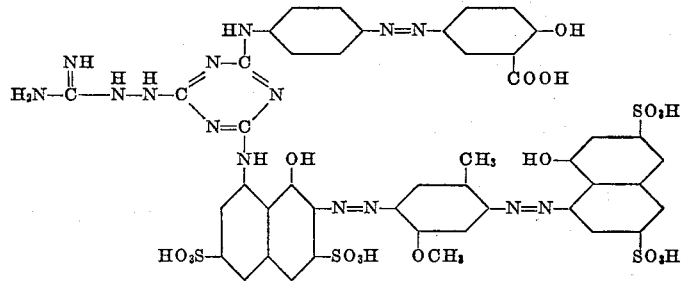

3. A triazine dye characterized by the following formula:

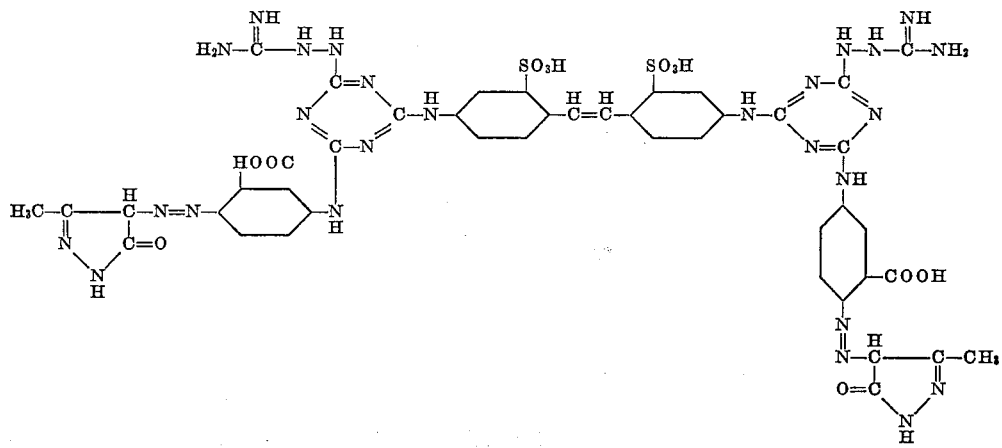

4. A triazine dye characterized by the following formula:

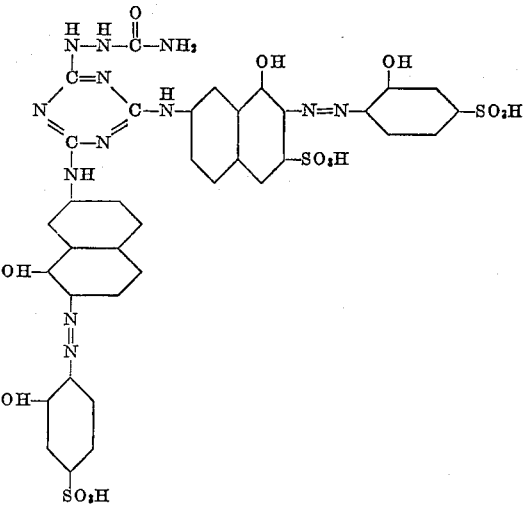

5. A triazine dye characterized by the following formula:

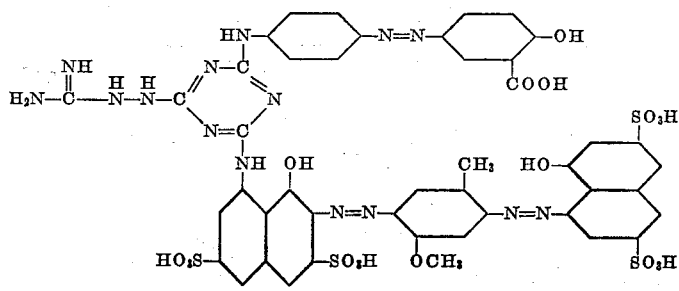

6. A triazine dye characterized by the following formula:
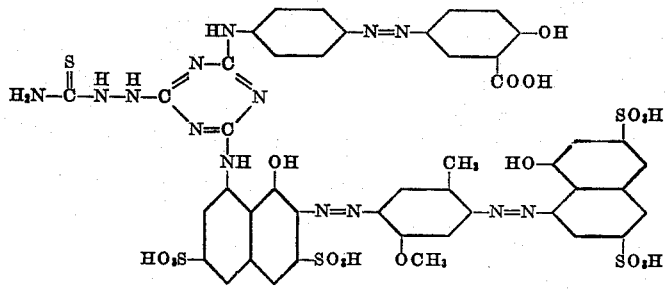
References Cited in the file of this patent
UNITED STATES PATENTS
| | | |
|---|---|---|
| 2,270,478 | Schmid | Jan. 20, 1942 |
| 2,295,565 | D'Alelio et al. | Sept. 15, 1942 |
| 2,399,066 | Schmid et al. | Apr. 23, 1946 |
| 2,537,834 | Kaiser et al. | Jan. 9, 1951 |